United States Patent
Kawanishi

(10) Patent No.: US 8,488,048 B2
(45) Date of Patent: Jul. 16, 2013

(54) IMAGE PICKUP APPARATUS FOR FINDING IN-FOCUS DIRECTION BASED ON FOCUS SIGNAL AND CONTROL METHOD FOR THE IMAGE PICKUP APPARATUS

(75) Inventor: Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 12/969,801

(22) Filed: Dec. 16, 2010

(65) Prior Publication Data

US 2011/0149133 A1 Jun. 23, 2011

(30) Foreign Application Priority Data

Dec. 22, 2009 (JP) ................. 2009-290313

(51) Int. Cl.
*H04N 5/232* (2006.01)
*G03B 13/18* (2006.01)

(52) U.S. Cl.
USPC ........................................... 348/345; 396/89

(58) Field of Classification Search
USPC ............. 348/345, 348–351, 353–356; 396/89
See application file for complete search history.

(56) References Cited

U.S. PATENT DOCUMENTS

| 7,403,230 B2 | 7/2008 | Yasuda |
| 7,456,895 B2 * | 11/2008 | Yoshikawa .................. 348/345 |
| 7,596,310 B2 * | 9/2009 | Ono et al. .................... 396/133 |
| 7,609,317 B2 | 10/2009 | Takemoto |
| 7,911,525 B2 * | 3/2011 | Ishikawa ..................... 348/345 |

FOREIGN PATENT DOCUMENTS

| JP | 2005-121819 | 5/2005 |
| JP | 2006-047954 | 2/2006 |

* cited by examiner

*Primary Examiner* — Timothy J Henn
(74) *Attorney, Agent, or Firm* — Cowan, Liebowitz & Latman, P.C.

(57) ABSTRACT

An image pickup apparatus includes an image pickup unit including two-dimensionally arranged photoelectric conversion elements, the image pickup unit being configured to perform an photoelectric conversion of an object image formed on an image pickup plane and to output an image signal, a detector configured to detect a focus signal based on the image signal obtained by moving a focus lens, and a controller configured to find an in-focus direction based on the focus signal and to provide a control so that the focus lens can be moved in the in-focus direction. The controller selects one of a plurality of interruption timings that occur in a synchronization signal in moving the focus lens, and starts moving the focus lens with a selected interruption timing.

5 Claims, 8 Drawing Sheets

IMAGE PICKUP APPARATUS FOR FINDING IN-FOCUS DIRECTION BASED ON FOCUS SIGNAL AND CONTROL METHOD FOR THE IMAGE PICKUP APPARATUS

BACKGROUND OF THE INVENTION

1. Field of the Invention

The present invention relates to focusing (control method) in an image pickup apparatus, such as a digital camera and a digital video camera.

2. Description of the Related Art

An autofocus (TV-AF) of a contrast detection method for an image pickup apparatus is known. In this TV-AF, a focus lens may stop during a storage time period of an image signal of a focus detection area. However, in a scene of a short storage time period, such as in use of a high-speed shutter, the focus lens is likely to move and an in-focus direction cannot be properly found although the image signal for the focus detection area is being stored. Accordingly, Japanese Patent Laid-Open No. ("JP") 2006-47954 sets a movement start timing of a focus lens so that the central timing of the exposure time period of the focus detection area can accord with the central timing of the stop time period.

However, the control disclosed in JP2006-47954 is complex and increases the cost, and thus there is a demand for simpler setting of the movement start timing of the focus lens.

SUMMARY OF THE INVENTION

An image pickup apparatus according to one aspect of the present invention includes an image pickup unit including two-dimensionally arranged photoelectric conversion elements, the image pickup unit being configured to perform an photoelectric conversion of an object image formed on an image pickup plane and to output an image signal, a detector configured to detect a focus signal based on the image signal obtained by moving a focus lens, and a controller configured to find an in-focus direction based on the focus signal and to provide a control so that the focus lens can be moved in the in-focus direction. The controller selects one of a plurality of interruption timings that occur in a synchronization signal in moving the focus lens, and starts moving the focus lens with a selected interruption timing.

Further features of the present invention will become apparent from the following description of exemplary embodiments with reference to the attached drawings.

DESCRIPTION OF THE EMBODIMENTS

A description will be given of embodiments of the present invention with reference to the accompanying drawings.

First Embodiment

Figure 1:
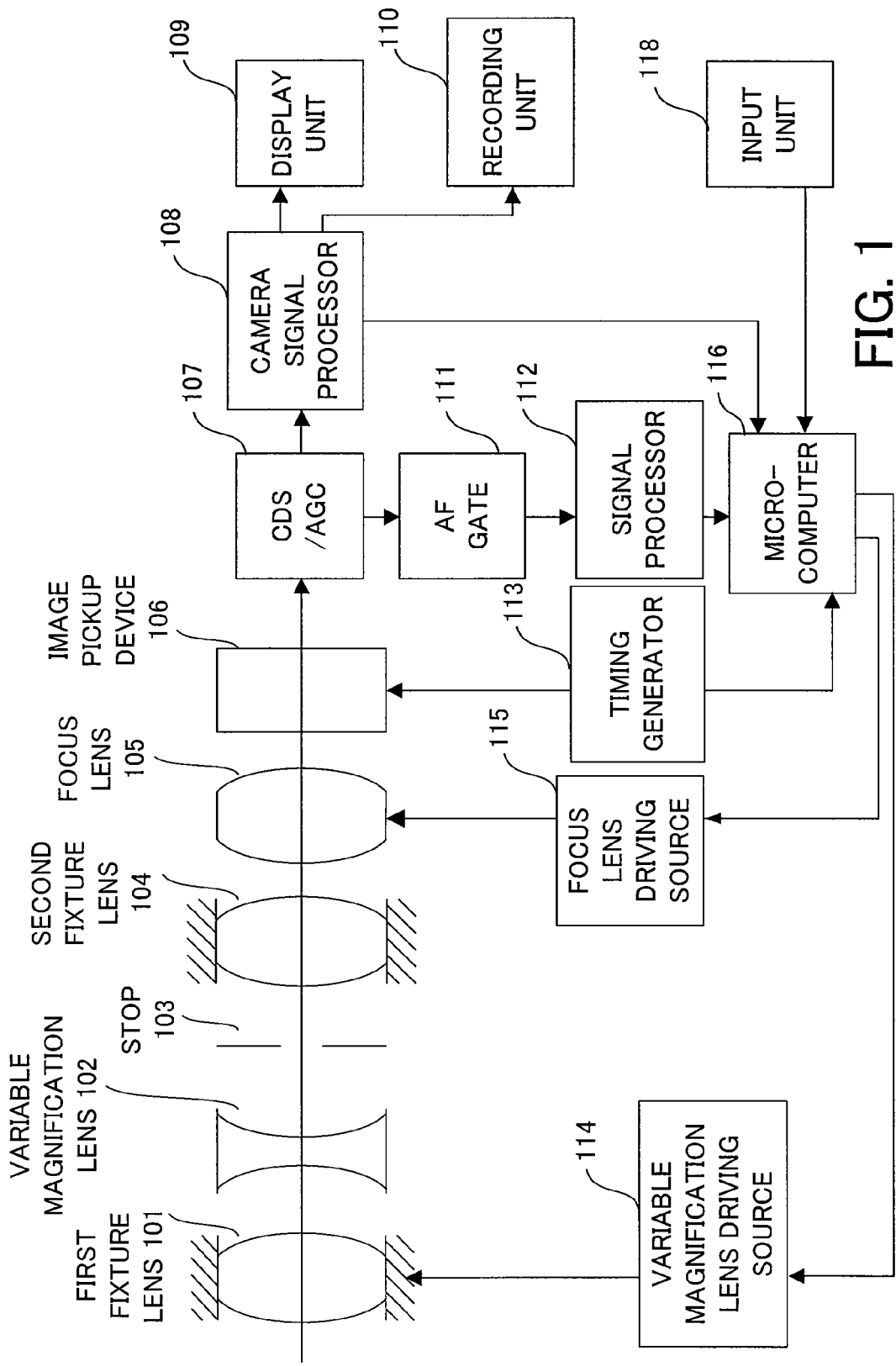
FIG. 1 is a block diagram of a video camera (image pickup apparatus) according to a first embodiment of the present invention.

FIG. 1 is a block diagram of a digital video camera (image pickup apparatus) of this embodiment. The video camera of this embodiment is integrated with an image pickup lens, but the image pickup lens may be exchangeable. In this case, a control signal generated by a microcomputer 116, which will be described later, is sent to a lens computer in the image pickup lens so as to control driving of a focus lens via the lens computer. In addition, this embodiment is applicable to a variety of image pickup apparatuses, such as a microscope and a digital still camera.

In FIG. 1, reference numeral 101 denotes a first fixture lens, and reference numeral 102 denotes a variable magnification lens configured to move in an optical axis direction and to vary the magnification. Reference numeral 103 denotes a stop, and reference numeral 104 denotes a second fixture lens. Reference numeral 105 denotes a focus lens that has both a focusing function and a so-called compensator function configured to correct an image plane movement along with a magnification variation. The first fixture lens 101, the variable fixation lens 102, the stop 103, the second fixation lens 104, and the focus lens 105 constitute an image pickup lens.

Reference numeral 106 denotes an image pickup device (or image pickup unit) that includes a plurality of photoelectric conversion elements and is configured to provide a photoelectric conversion of an optical image (or an object image) formed on an image plane into an electric signal and to output it as an image signal. When the image pickup device 106 includes a CMOS image sensor, the image pickup device 106 has a plurality of two-dimensionally arranged photoelectric conversion elements. Each of the two-dimensionally arranged photoelectric conversion elements is sequentially scanned and exposed, and an image signal is generated by sequentially scanning an electric signal from each photoelectric conversion element (rolling shutter function). In the image pickup device equipped with the rolling shutter function, the exposure timing is different for each line in the same image pickup screen. While the image pickup device 106 of this embodiment includes a CMOS image sensor, the image pickup device may include a CCD sensor because this embodiment is effective when the exposure time period varies along with a different shutter velocity.

Reference numeral 107 denotes a CDS/AGC/AD converter configured to provide sampling, gain adjustments, and digitalization for an output of the image pickup device 106. Reference numeral 108 denotes a camera signal processor configured to perform a variety of image processing for the output signal from the CDS/AGC/AD converter 107 and to generate a video signal.

Reference numeral 109 denotes a display unit, such as an LCD, configured to display a video signal from the camera signal processor 108. Reference numeral 110 denotes a recording unit configured to record an image signal from the camera signal processor 108 in a recording medium, such as a semiconductor memory.

Reference numeral 111 denotes an AF gate configured to allow a passage of only a signal from a focus detection area among output signals from all pixels from the CDS/AGC/AD converter 107.

Reference numeral 112 denotes a signal processor configured to generate an AF evaluation value signal by extracting a high frequency component or a brightness difference component (which is a difference between a maximum value and a minimum value of a brightness level of a signal that has passed the AF gate 111) generated from the high frequency component from the signal that has passed the AF gate 111. The signal processor 112 serves as a detector configured to detect a focus signal based on the image signal obtained by moving the focus lens.

The AF evaluation value signal represents the sharpness (contrast value) of an image obtained by processing an output signal from the image pickup device 106, and is a focus signal used to evaluate the in-focus state of the image pickup optical system since the sharpness changes according to the in-focus state of the image pickup optical system.

Reference numeral 113 denotes a timing generator configured to generate a variety of synchronization signals, such as a vertical synchronization signal, and provides a timing control for exposure and readout of the image pickup device 106 and the camera microcomputer 116, which will be described later.

Reference numeral 114 denotes a variable magnification lens driving source that includes an actuator and a driver used to move the variable magnification lens 102. Reference numeral 115 denotes a focus lens driving source that includes an actuator and a driver used to move the focus lens 105. The actuator of each of the variable magnification lens driving source 114 and the focus lens driving source 115 may be a stepping motor, a DC motor, an oscillation type motor, or a voice coil motor.

The microcomputer ("MC") 116 serves as a controller (processor) configured to control whole operations of the video camera, and to provide the TV-AF (focusing) used to move the focus lens 105 based on the output signal of the signal processor 112. The MC 116 includes a memory configured to hold a ratio n %, and timings C and D, which will be described later.

In the TV-AF, the MC 116 performs wobbling so as to find an in-focus direction and then provides the mountain climbing in the in-focus direction. In the wobbling, the MC 116 reciprocates the focus lens 105 with a small amplitude in the optical-axis direction, and moves the center of the reciprocation of the focus lens 105 in a direction in which the AF evaluation value representative of the contrast value increases. In other words, the MC 116 finds the in-focus direction based on the focus signal, and controls the focus lens driving source 115 so that the focus lens 105 can move in the in-focus direction. In the mountain climbing, the MC 116 controls the focus lens driving source 115 configured to drive the focus lens 105 so that the focus lens 105 can be focused on the in-focus position corresponding to the peak of the AF evaluation value.

Reference numeral 118 denotes an input unit (setting unit) configured to provide a variety of inputs or settings, such as a setting of a focus detection area on the image pickup screen which is an object of the AF evaluation value.

Figure 2:
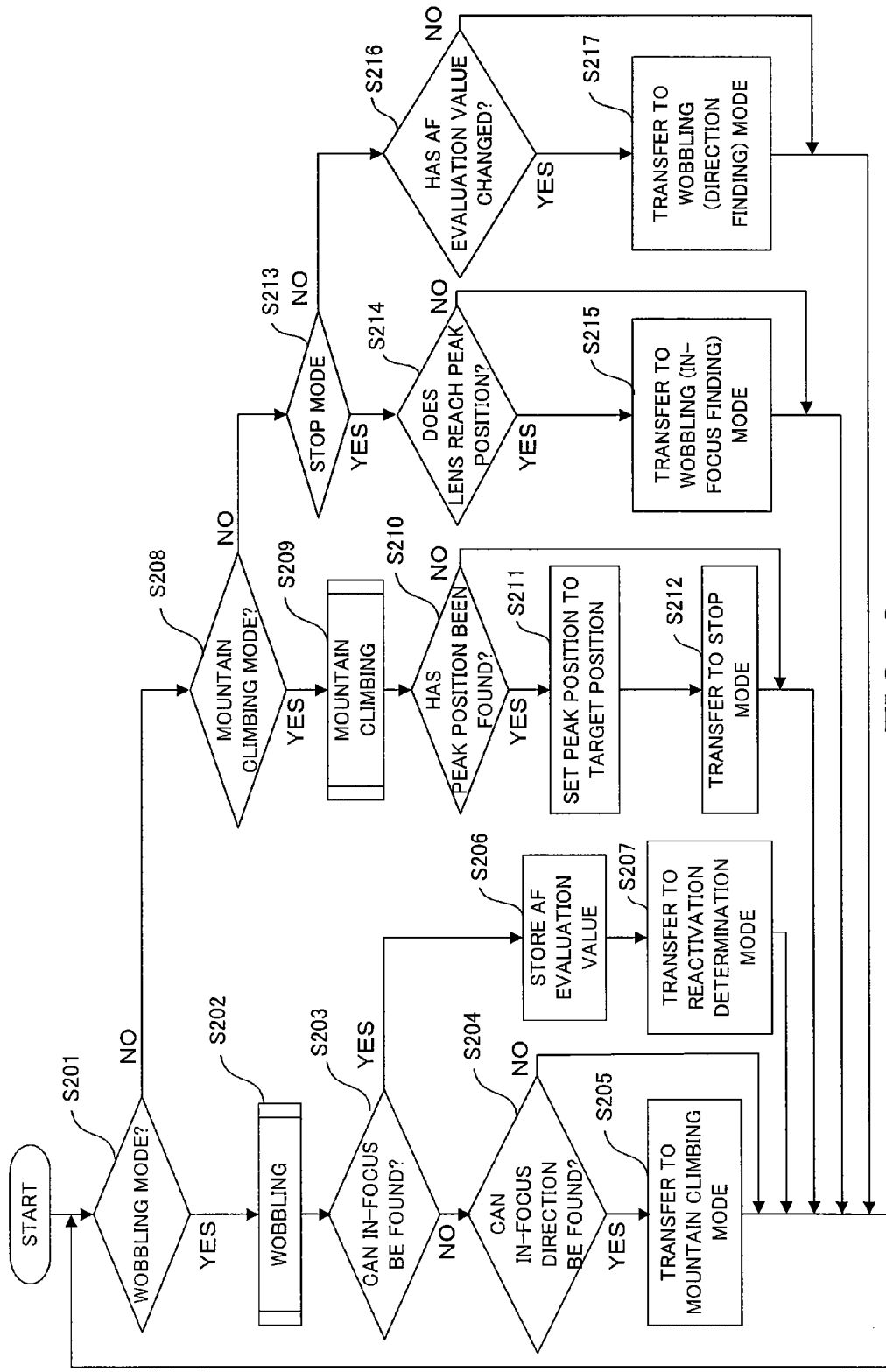
FIG. 2 is a flowchart for explaining an AF action of a microcomputer illustrated in FIG. 1.

FIG. 2 is a flowchart illustrating a TV-AF operation by the MC 116 (control method of the image pickup apparatus), and "S" denotes an abbreviation of the step in FIG. 2 and subsequent figures.

Initially, the MC 116 determines whether or not the current mode is a wobbling mode (S201), if so the MC 116 reciprocates the focus lens 105 with a predetermined amplitude, and finds the in-focus state or a direction of the in-focus position. The amplitude at this time is a small amplitude so that the movement of the focus lens 105 cannot be recognized on the screen (S202).

Next, the MC 116 determines whether or not the in-focus has been found (S203). When determining that the in-focus has not been found (No of S203), the MC 116 determines whether the in-focus direction has been found (S204).

When determining that the in-focus direction has not yet been found (No of S204), the MC 116 terminates the process. On the other hand, when determining that the in-focus direction has been found (Yes of S204), the MC 116 transfers the process to the mountain climbing mode (S205) and returns the flow to S201.

On the other hand, when determining the in-focus has been found (Yes of S203), the MC 116 stores the AF evaluation value of the in-focus point (S206), transfers a process to a reactivation determination mode (S207) that determines whether or not the wobbling (direction finding) is again repeated (S216, S217), and returns the flow to S201.

On the other hand, when determining that the current mode is not a wobbling mode (No of S201), the MC 116 determines whether or not the current mode is the mountain climbing mode (S208) and if so performs mountain climbing (S209). In S209, similar to FIGS. 6-7 of JP 2005-121819, the MC 116 moves the focus lens 105 in accordance with the mountain climbing method at a predetermined velocity in a direction in which the AF evaluation value increases.

Next, the MC 116 determines whether the focus lens 105 crosses a peak of the AF evaluation value (S210), and if not (No of S210) returns the flow to S201.

On the other hand, when determining that the focus lens 105 crosses the peak of the AF evaluation value (Yes of S210), the MC 116 sets the in-focus position corresponding to the peak of the AF evaluation value to a target position of the focus lens 105 (S211), transfers the process to the stop mode (S212), and returns the flow to S201.

On the other hand, when determining that the current mode is not the mountain climbing mode (No of S208), the MC 116 determines whether the current mode is a stop mode (S213) and if so determines whether the focus lens 105 has reached the peak position of the AF evaluation value (S214).

When determining that the focus lens 105 has reached the peak position (Yes of S214), the MC 116 transfers a process to the wobbling (in-focus finding) mode (S215) and returns the flow to S201. On the other hand, when determining that the focus lens 105 has not yet reached the peak position (No of S214), the MC 116 returns the flow to S201.

On the other hand, when determining that the current mode is not the stop mode (No of S213), the MC 116 compares the AF evaluation value stored in S206 with the current AF evaluation value and determines whether the current AF evaluation value has changed by a threshold or larger (S216).

When determining that the AF evaluation value has not yet changed by the threshold or larger (no of S216), the MC 116 returns the flow to S201. On the other hand, when determining that the AF evaluation value has changed by the threshold or larger (Yes of S216), the MC 116 transfers the process to the wobbling (direction finding) mode (S217).

Thus, in the TV-AF, this embodiment moves the focus lens 105 by repeating the reactivation determination, the wobbling, the mountain climbing, the stop, the wobbling, and the reactivation determination in this order, and maintains the in-focus state so that the AF evaluation value can be maximum.

Figure 3:
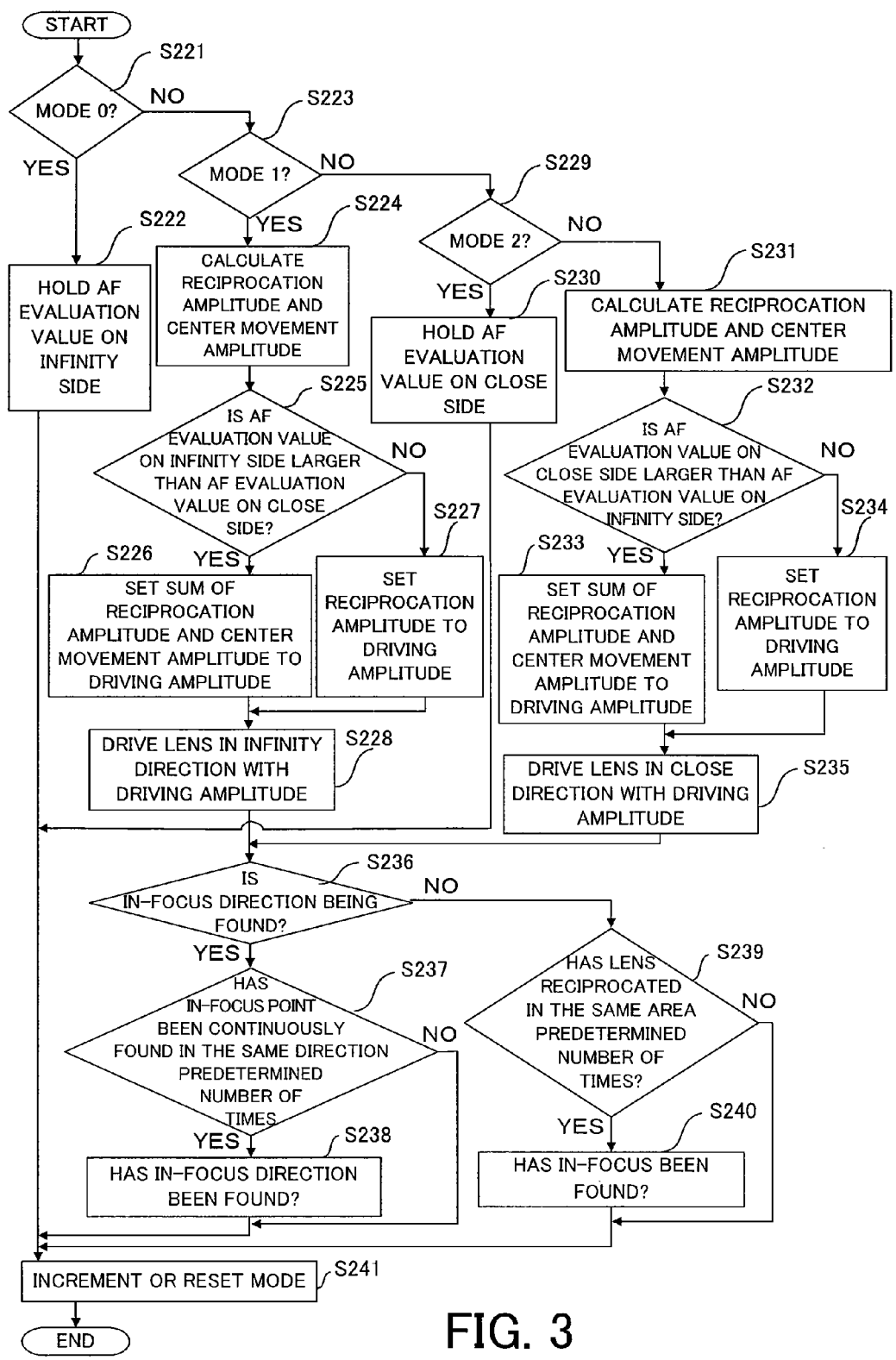
FIG. 3 is a detailed flowchart of S202 illustrated in FIG. 2.

FIG. 3 is a detailed flowchart of the wobbling in S202. In the wobbling, the focus lens 105 is micro-reciprocated in the optical-axis direction, the in-focus direction is detected based on the AF evaluation value at that time, and the center of the reciprocation is moved toward the detected in-focus direction simultaneous with the reciprocation.

On the premise, the MC 116 calculates the reciprocation amplitude and the (reciprocation) center movement amplitude in accordance with the depth of focus determined by the stop 103, the zoom position, etc.

Initially, the MC 116 determines whether or not the current mode representative of the operational state of the wobbling is 0 (S221), and if so performs the process for the focus lens 105 located at the close side.

Initially, the MC 116 stores the current AF evaluation value as the AF evaluation value at the infinity side (S222). This AF evaluation value is obtained from the image signal generated by the electric charges stored in the image pickup device 106 when the focus lens 105 is located at a position on the infinity side in S230, which will be described later. Next, the MC 116 increments the mode (number), and resets the mode to 0 (S241) when the mode becomes four or larger, and completes the process.

On the other hand, when determining that the current mode is not 0 (No of S221), then the MC 116 determines whether or not the current mode is 1 (S223) and if so performs a process to move the focus lens 105 in the infinity direction.

Initially, the MC 116 sets the reciprocation amplitude and the center movement amplitude used to drive the focus lens 105 (S224). Usually, these amplitudes are set within the depth of focus.

Next, the MC 116 determines whether the AF evaluation value on the infinity side is larger than that on the close side (S225).

When determining that the AF evaluation value on the infinity side is larger (Yes of S225), then the MC 116 sets the driving amplitude to a sum of the reciprocation amplitude and the center movement amplitude (S226). On the other hand, when determining that the AF evaluation value on the close side is larger (No of S225), then the MC 116 sets the driving amplitude to the reciprocation amplitude (S227).

Next, the MC 116 moves the focus lens 105 with the driving amplitude determined in S226 or S227 in the infinity direction (S228).

On the other hand, when determining that the current mode is not 1 (No of S223), then the MC 116 determines whether or not the current mode is 2 (S229) and if so performs the process for the focus lens position on the infinity side.

Initially, the MC 116 stores the current AF evaluation value as the AF evaluation value on the close side (S230). This AF evaluation value is obtained from the image signal generated from the electric charges stored in the image pickup device 106 when the focus lens 105 is located at the close side in S222. Next, the MC 116 increments the mode, resets it to 0 when it is 4 or larger (S241), and terminates the process.

On the other hand, when determining that the current mode is 3 rather than 2 (No of S229), the MC 116 performs a process to move the focus lens 105 in the close direction.

Initially, the MC 116 sets the reciprocation amplitude and the center movement amplitude used to drive the focus lens 105 (S231). Usually, these amplitudes are set within the depth of focus. Next, the MC 116 determines whether the AF evaluation value on the close side is larger than that on the infinity side (S232).

When determining that the AF evaluation value on the close side is larger (Yes of S232), the MC 116 sets the driving amplitude to a sum of the reciprocation amplitude and the center movement amplitude (S233). On the other hand, when determining that the AF evaluation value on the infinity side is larger (No of S232), the MC 116 sets the driving amplitude to the reciprocation amplitude (S234).

Next, the MC 116 drives the focus lens in the close direction with an amplitude determined by S233 or S234 (S235).

After S228 or S235, the MC 116 determines whether the in-focus direction is being found (S236). When determining that the in-focus direction is being found (Yes of S236), the MC 116 determines whether or not the in-focus point has been found in the same direction a predetermined number of times (S237) and if not transfers the flow to S241. On the other hand, when determining that the in-focus point is found in the same direction a predetermined number of times (Yes of S237), the MC 116 determines that the in-focus direction has been found (S238) and transfers the flow to S241.

On the other hand, when determining that the in-focus direction is not being found (No of S236), the MC 116 determines whether the focus lens 105 has reciprocated in the same area a predetermined number of times (S239). When determining that the focus lens 105 has not reciprocated in the same area a predetermined number of times (No of S239), the MC 116 transfers the flow to S241. On the other hand, when determining that the focus lens 105 has reciprocated in the same area a predetermined number of times (Yes of S239), the MC 116 determines that the in-focus has been found (S240) and transfers the flow to S241.

Figure 4:
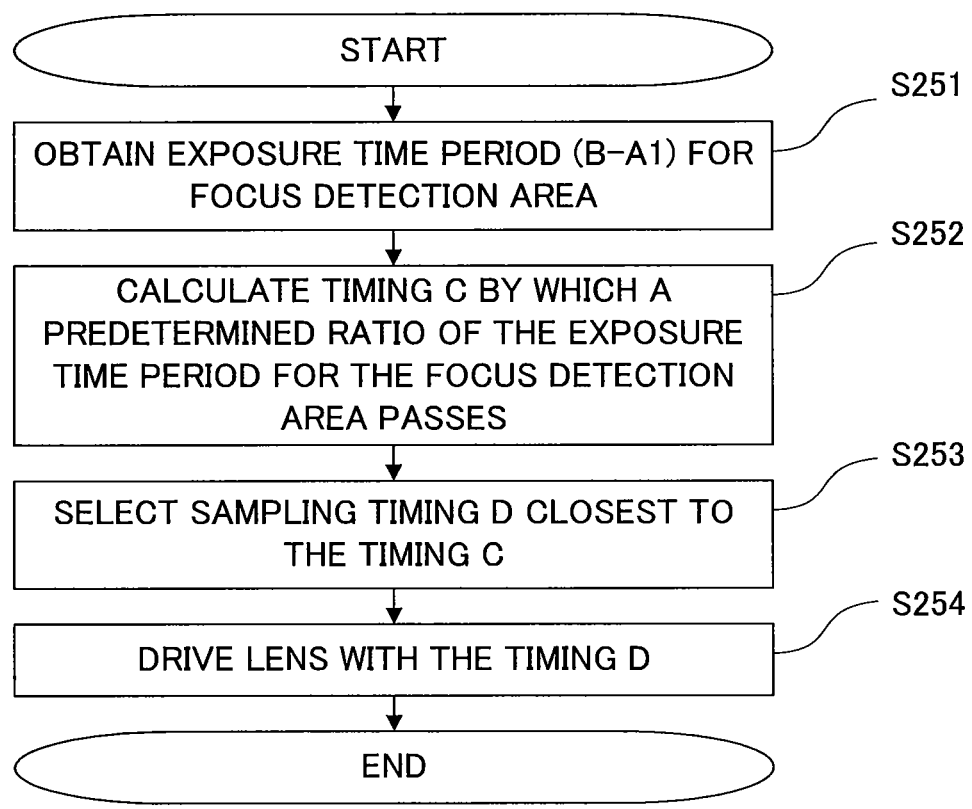
FIG. 4 is a flowchart for explaining a driving timing of S228 or S235 illustrated in FIG. 3.

FIG. 4 is a flowchart for determining the timing used to drive the focus lens 105 in the infinity direction in S228 or in the close direction in S235.

Figure 5A:
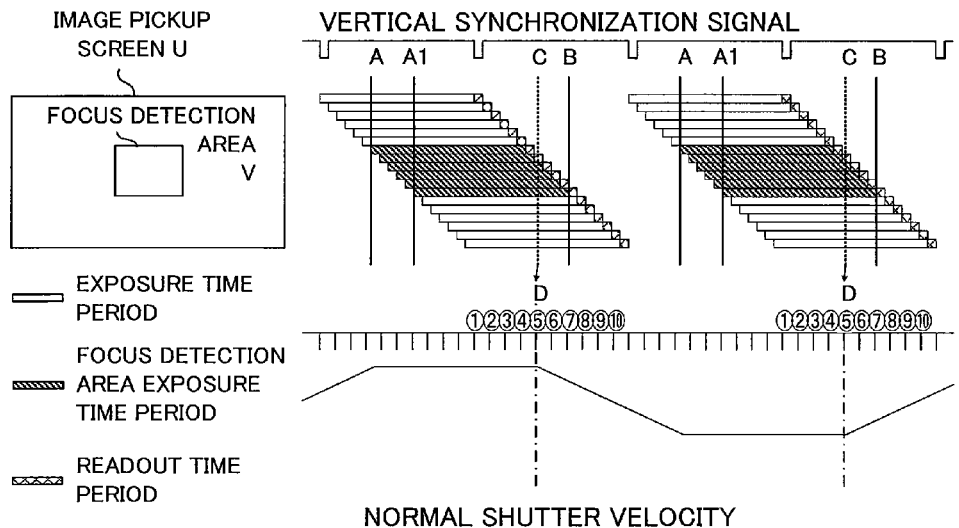
FIGS. 5A and 5B are views for illustrating a relationship between an exposure time period of an image pickup screen and a driving time period of a focus lens according to the first embodiment.
Figure 5B:
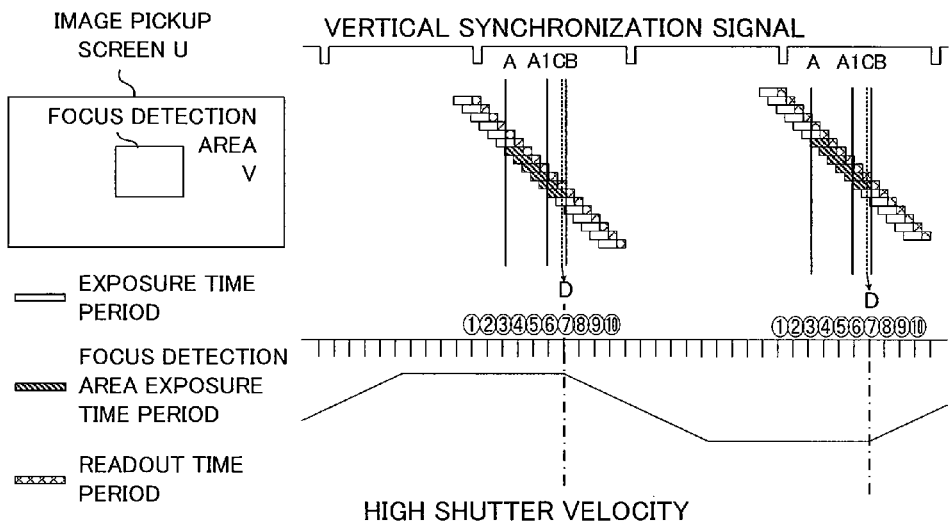

FIG. 5A is a view illustrating a relationship between the exposure time period of the image pickup screen and the driving time period of the focus lens 105 for the normal shutter velocity. FIG. 5B is a view illustrating a relationship between the exposure time period of the image pickup screen and the driving time period of the focus lens 105 for the high-speed shutter velocity.

Each left side in FIGS. 5A and 5B illustrates a focus detection area V set in an image pickup screen U.

A vertical synchronization signal is illustrated on the upper right side of each of FIGS. 5A and 5B, and the readout of the image pickup device 106 for each line in the same image pickup screen U is illustrated under the vertical synchronization signal. The white part denotes the exposure time period, and the exposure time period of the focus detection area V is particularly hatched. The dotted part denotes the readout time period used to read out the image pickup signal from the image pickup device 106. The interruption timing of the timing generator 113 is illustrated below. Change over time of the focus lens 105 are illustrated below the interruption timing similar to FIG. 6, which will be described later, where the abscissa axis denotes the time the ordinate axis denotes the position of the focus lens 105. The flat portion is a stop time period used to obtain the AF evaluation value so as to find the in-focus direction, and the alternate long and short dash line denotes the start timing (start time) of the wobbling.

In FIG. 4, the MC 116 initially obtains the exposure time period of the focus detection area V set in the image pickup screen U (S251). More specifically, the MC 116 obtains the information of the exposure start time and exposure end time of the focus detection area V. In FIGS. 5A and 5B, a time period from A to B corresponds to the exposure time period of the whole focus detection area, but, the exposure time period is set as B−A1 from A1 to B on the basis of the final line of the focus detection area V for simplicity purposes.

Next, the MC 116 calculates a timing corresponding to an elapse of a preset ratio no of the exposure time period (B−A1)

obtained by S251 (S252). Since the exposure time period is set to a time period from A1 to B, the timing C can be obtained by C=A1+(B−A1)×n/100. Since it is necessary to set the ratio no so that the AF evaluation value necessary to find the in-focus direction of the wobbling can be stored, a condition of 50<n<100 may be satisfied.

Next, the MC 116 selects the timing D closest to the timing C calculated by S252 among the interruption timings that occur every existing sampling period (S253). The interruption timings that occur every existing sampling period is an interruption generated by the timing generator 113, and generally set to integer times approximately as large as the vertical synchronization signal.

FIGS. 5A and 5B illustrate an example of ten interruptions in one vertical synchronization signal. Since the fifth interruption timing is closest to the timing C in FIG. 5A and the seventh interruption timing is closest to the timing C in FIG. 5B, these interruption timings are selected as the driving timing D of the focus lens 105.

Next, the MC 116 moves the focus lens 105 at the timing D selected by S253 (S254). Thereby, even when the shutter velocity varies and the exposure time period shifts as illustrated by FIGS. 5A and 5B, a driving timing of the focus lens 105 enough to obtain the AF evaluation value necessary to find the in-focus direction can be set.

Figure 6:
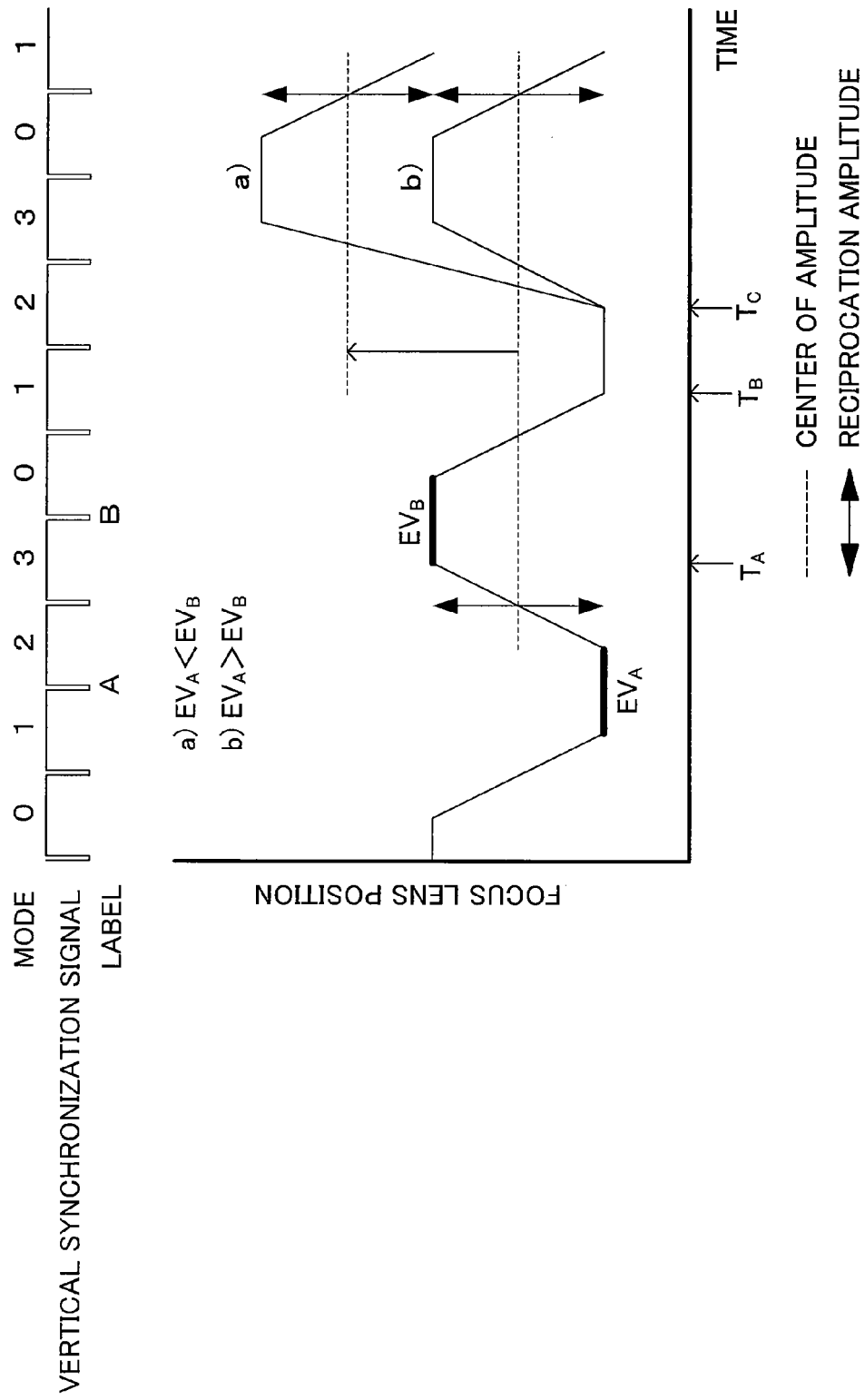
FIG. 6 is a graph illustrating changes over time of a position of the focus lens in the wobbling.

FIG. 6 is a graph illustrating a time elapse of a position of the focus lens 105 in the wobbling. The top of FIG. 6 illustrates a wobbling mode, a vertical synchronization signal of an image signal, and a label. In the bottom of FIG. 6, the abscissa axis denotes the time, and the ordinate axis denotes the position of the focus lens 105.

An AF evaluation value $EA_A$ for electric charges stored in the image pickup device 106 at time of Label A is taken in by the MC 116 at time $T_A$. An AF evaluation value $EA_B$ for electric charges stored in the image pickup device 106 at time of Label B is taken in by the MC 116 at time $T_B$.

At time $T_C$, the MC 116 compares the AF evaluation value $EV_A$ with the AF evaluation value $EV_B$, and moves the reciprocation center illustrated by a dotted line when $EV_B$ is larger. The focus lens 105 is moved on the basis of the depth of focus, and the movement amount that cannot be recognized on the screen is set.

This embodiment changes a driving timing of the focus lens 105 in accordance with the exposure time period in the wobbling, but the driving timing may be set constant irrespective of the exposure time period when the driving amplitude of the wobbling is small and the focus lens can be sufficiently moved to the target position.

Thus, the MC 116 in this embodiment selects for the wobbling one of a plurality of interruption timings, which is closest to the timing C at which the set ratio no of the exposure time period passes after the exposure of the focus detection area V starts. The MC 116 then starts moving the focus lens 105 in the infinity direction or in close direction with the selected timing D.

Thus, this embodiment does not perform a complex operation as in the operation of $t_0$ disclosed in JP 2006-47954. Instead, this embodiment selects one of a plurality of interruption timings generated by the timing generator 113, based on the held ratio no and the exposure time period for the photoelectric conversion element corresponding to the focus detection area V. As a result, this embodiment can set the movement start timing of the wobbling comparatively easily.

While the MC 116 in this embodiment selects one of a plurality of interruption timings that occur in the synchronization signal, which is closest to the timing C, the selected interruption timing is not limited to this timing as long as it is one of the interruption timings.

The movement of the focus lens 105 is started by the controller as the MC 116 in this embodiment, but it is sufficient that the movement of the focus lens 105 starts with the interruption timing.

Second Embodiment

Figure 7:
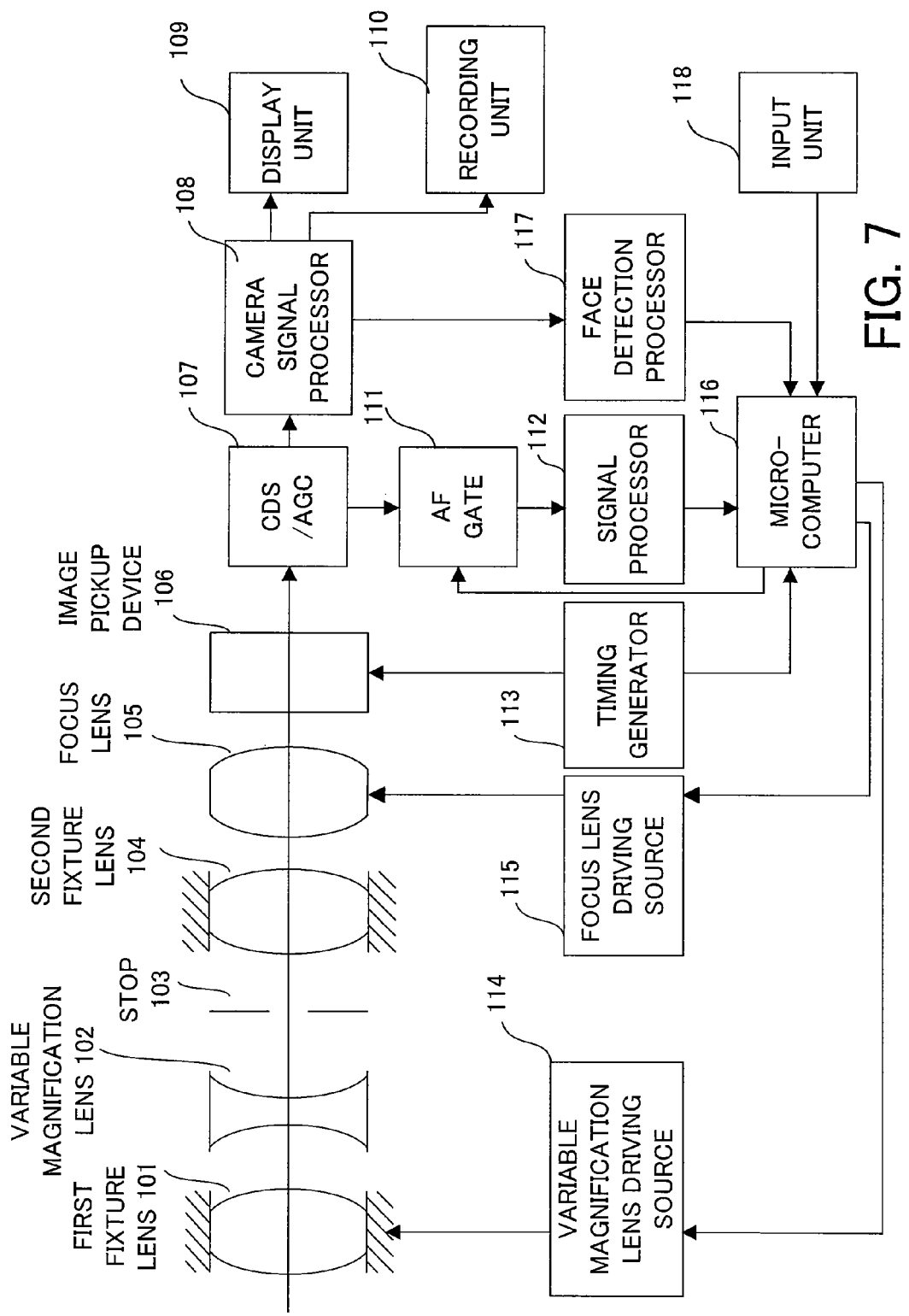
FIG. 7 is a block diagram of a video camera (image pickup apparatus) according to a second embodiment of the present invention.

This embodiment changes a driving timing of the focus lens 105 when the focus detection area is arranged at a position other than the center. FIG. 7 is a block diagram of an image pickup apparatus, and its structure is similar to that illustrated in FIG. 1 except for the image pickup apparatus illustrated in FIG. 7 includes a face detection processor 117.

The face detection processor 117 performs a face detection process for the image signal, and obtains object information, such as a size, a position, and a likelihood of a human face in the image pickup screen, and sends the result to the MC 116. Based on the detection result of the face detection processor 117, the MC 116 sends information to the AF gate 111 so as to add a focus detection area to a position that includes a face area in the image pickup screen.

The face detection process may use a variety of methods, for example, a method of extracting a skin color area based on a gradation color of each pixel of image data and of detecting a face utilizing the matching degree with a contour plate of a sample face, and a pattern recognition method utilizing extracted feature points of a face, such as an eye, a nose, and a mouth.

Figure 8A:
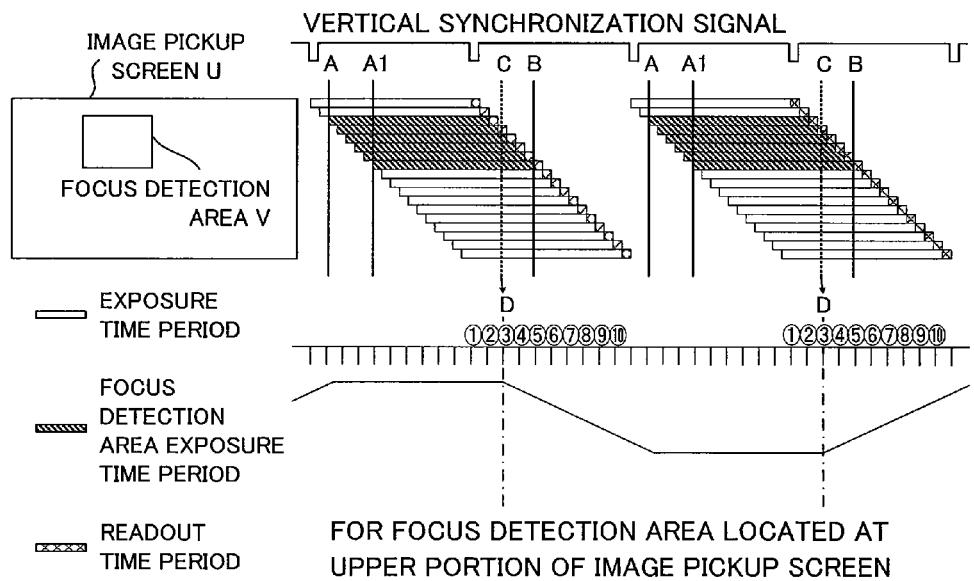
FIGS. 8A and 8B are views for illustrating a relationship between an exposure time period of an image pickup screen and a driving time period of a focus lens according to the second embodiment.
Figure 8B:
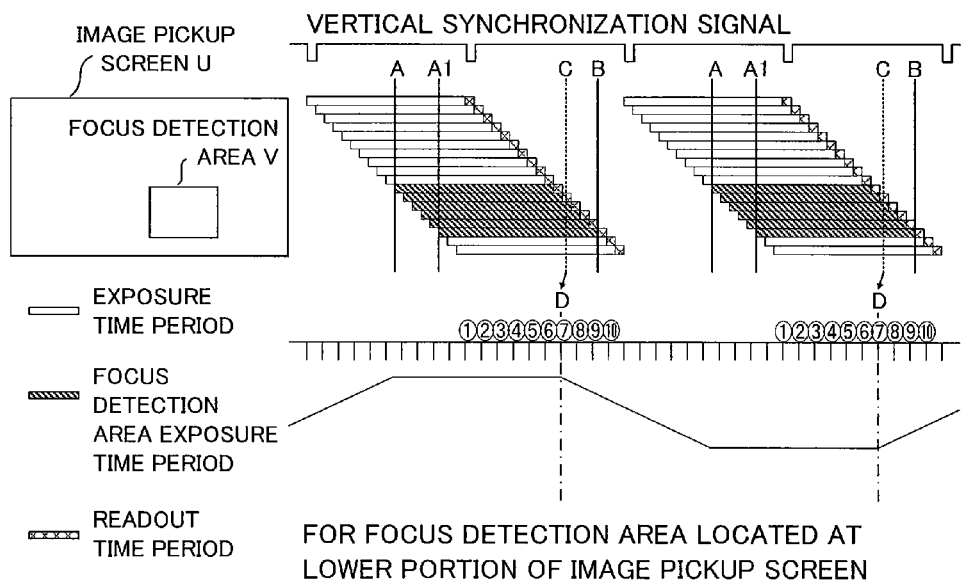

FIGS. 8A and 8B are views illustrating a relationship between the exposure time period of the image pickup screen U and the driving time period of the focus lens 105. FIG. 8A illustrates that the face detection processor 117 detects a focus detection area V that is located at the upper portion of the image pickup screen U. FIG. 8B illustrates that the face detection processor 117 detects a focus detection area V that is located at the lower portion of the image pickup screen U.

Since the position of the focus detection area V is different between FIG. 8A and FIG. 8B, the exposure timing and the readout timing shift in the vertical synchronization signal between FIG. 8A and FIG. 8B. However, similar to the first embodiment, the movement start timing of the focus lens 105 can be set by performing the process illustrated in FIG. 4.

The MC 116 even in this embodiment selects for the wobbling one of a plurality of interruption timings, which is closest to the timing C at which the set ratio no of the exposure time period passes after the exposure of the focus detection area V starts. The MC 116 starts moving the focus lens 105 in the infinity direction or in the close direction with the selected timing D.

In selecting the interruption timing D, the MC 116 relies on the time when the set ratio no of the exposure time period has elapsed after the exposure of the focus detection area V starts. In other words, the MC 116 obtains the information of the exposure start time and the exposure end time of the focus detection area V. As the position of the focus detection area changes, the exposure start time differs and the movement start timing of the focus lens 105 differs. As a result, the MC 116 can select the interruption timing in accordance with the position of the focus detection area.

The flowcharts illustrated in FIGS. 2 to 4 can be implemented as a program executed by a computer (processor).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus is applicable to an application of image pickup of an object.

This application claims the benefit of Japanese Patent Application No. 2009-290313, filed Dec. 22, 2009, which is hereby incorporated by reference herein in its entirety.

What is claimed is:

1. An image pickup apparatus comprising:
   an image pickup unit including two-dimensionally arranged photoelectric conversion elements, the image pickup unit being configured to perform an photoelectric conversion of an object image formed on an image pickup plane and to output an image signal;
   a detector configured to detect a focus signal based on the image signal obtained by moving a focus lens; and
   a controller configured to find an in-focus direction based on the focus signal and to provide a control so that the focus lens can be moved in the in-focus direction,
   wherein the controller selects one of a plurality of interruption timings in accordance with an exposure time period in the photoelectric conversion element corresponding to the focus detection area that occur in a synchronization signal in moving the focus lens, and starts moving the focus lens with a selected interruption timing.

2. The image pickup apparatus according to claim 1, wherein the image pickup unit sequentially scans the two-dimensionally arranged photoelectric conversion elements for exposure and readout.

3. The image pickup apparatus according to claim 1, wherein the controller finds the in-focus direction by reciprocating the focus lens in an optical-axis direction, and moves a center of a reciprocation in the in-focus direction.

4. A control method of an image pickup apparatus that includes an image pickup unit including two-dimensionally arranged photoelectric conversion elements, the image pickup unit being configured to perform an photoelectric conversion of an object image formed on an image pickup plane and to output an image signal, the control method comprising the steps of:
   detecting a focus signal based on the image signal obtained by moving a focus lens;
   finding an in-focus direction based on the focus signal; and
   providing a control so that the focus lens can be moved in the in-focus direction,
   wherein the providing step selects one of a plurality of interruption timings in accordance with an exposure time period in the photoelectric conversion element corresponding to the focus detection area that occur in a synchronization signal in moving the focus lens, and starts moving the focus lens with a selected interruption timing.

5. The image pickup apparatus according to claim 1, wherein a plurality of interruption timings is the interruption timings that occur every existing sampling period.

* * * * *